2,850,548

PURIFICATION OF 2-ISOPROPYLNAPHTHALENE

Jack H. Thelin and Gerard N. Vriens, Somerville, N. J., assignors to American Cyanamid Company, New York, N. Y., a corporation of Maine No Drawing. Application March 23, 1956
Serial No. 573,340

1 Claim. (Cl. 260—674)

This invention relates to the separation of 2-isopropylnaphthalene from mixtures containing the 1-isomer, and particularly the separation of the 2-isopropylnaphthalene in the $\beta$ crystalline form.

When naphthalene is reacted with propylene or isopropanol a mixture of 1- and 2-isopropylnaphthalenes is obtained. The 2-isomer is frequently desirable, for example for use in a recently developed process of preparing 2-naphthol by the oxidation of 2-isopropylnaphthalene to the corresponding hydroperoxide and cleaving the hydroperoxide with acid to form a mixture of acetone and 2-naphthol. The 2-isomer is also useful as a starting material in processes for preparing 2-naphthoic acid.

The catalytic propylation of naphthalene gives substantial amounts of the 1-isomer and as the two isomers boil within 1° C. of each other separation by fractional distillation is not practical. Depending upon reaction conditions, and by halting the propylation before all of the naphthalene has reacted, a mixture is produced containing unreacted naphthalene, some polyisopropylnaphthalenes and a mixture of monoisopropylnaphthalenes containing from about 50 to 95% of the 2-isomer. Separation of the naphthalene and the polypropylated naphthalenes from the monoisopropylnaphthalenes by distillation is, of course, simple.

A very important separation problem is presented by the unreacted isopropylnaphthalenes involves in the reaction mixture from the air oxidation and cleavage to acetone and 2-naphthol referred to above. The oxidation step normally produces a mixture in which only part of the isopropylnaphthalene is oxidized. As a result, when the acetone and 2-naphthol produced in the cleavage step are removed there remains a mixture of isopropylnaphthalenes in which the proportion of the 2-isomer is lower because there is a preferential oxidation of the 2-isomer. Ordinarily, the whole of this residual mixture of the two isopropylnaphthalenes is recycled through the propylating step together with the unreacted naphthalene of this step and the polypropylated naphthalenes. Depropylation of the polyisopropylnaphthalenes and isomerization of the 1-isomer takes place, producing again a mixture in which the 2-isopropylnaphthalene may be present in varying amounts. If it were posible economically to effect a separation of 1- and 2-isomers the volume recycled to the alkylation step could be greatly reduced with a corresponding saving in cost.

According to the present invention, we have found that when a mixture of 1- and 2-isopropylnaphthalene is subjected to cooling below the freezing point of the mixture the 2-isopropylnaphthalene precipitates free from 1-isopropylnaphthalene and the crystals can be readily removed by filtering, for example, in a centrifuge. Where desired, the procedure can be repeated to increase the purity. Similarly, the mother liquor can be further cooled to successively lower temperatures to obtain additional crops of crystals, the limit being reached when the content of 2-isopropylnaphthalene is reduced to about 35% at about −30° C. At this point a eutectic forms and so further separation is possible by this means. However, the eutectic mixture can be isomerized by recycling through the alkylation step as described above and in this manner a very high proportion of the original naphthalene can be transformed into 2-isopropylnaphthalene.

2-Isopropylnaphthalene exists in either of two crystalline modifications or phases which are designated $\alpha$ and $\beta$. At times 1-isopropylnaphthalene is referred to as alpha-isopropylnaphthalene, and the 2-isomer as beta-. To avoid confusion the Greek letters are here used for the crystalline modification and numbers to designate the side chain position.

The $\alpha$ form is the normal stable form. It melts at 15.1° C. and exists in the form of friable leaflets which give a creamy or pasty consistency to the slurry. These $\alpha$ crystals do not filter readily and tend to occlude considerable of the mother liquor.

The $\beta$ form of 2-isopropylnaphthalene melts at 11.4° C. and exists as dense hard agglomerates. These hard crystals filter very readily and give a high degree of purification. By seeding with $\beta$ form crystal seeds, the $\beta$ form is readily obtained.

The separation in the $\beta$ form is particularly advantageous, and methods of obtaining this preferential form are illustrated by certain of the following examples, the parts being by weight.

*Example 1*

309 parts of a mixture containing 94.5% 2-isopropylnaphthalene and 5.5% of the 1-isomer is cooled to 3° C., at which point it crystallizes spontaneously in the $\alpha$ form. The slurry is centrifuged, to give 18 parts of crystalline 2-isopropylnaphthalene of 98.4% purity. Allowing the crystals to partially melt gives a low yield of comparatively high purity.

*Example 2*

300 parts of the same starting material used in Example 1 is cooled to 2° C. and seeded with $\alpha$ form of 2-isopropylnaphthalene crystals. The crystallization is carried further than in Example 1, and centrifuging gives 85 parts of product of 96.3% purity.

*Example 3*

The above starting material is cooled to 2° C. and induced to crystallize in the $\beta$ modification, instead of the $\alpha$ modification obtained in Examples 1 and 2, by seeding with $\beta$ form seed crystals. On centrifuging, 487 parts of starting material gives 84 parts of crystals of 99.1% purity. The use of $\beta$ seeds gives a high yield of high purity 2-isopropylnaphthalene.

We claim:

A process for recovering comparatively pure 2-isopropylnaphthalene in the $\beta$ crystalline form from a solvent-free mixture consisting essentially of isopropylnaphthalene containing less than 65% of 1-isopropylnaphthalene consisting of cooling the solvent-free mixture to a temperature below its freezing point, seeding the mixture with $\beta$ modification seeds, thereby inducing crystallization of 2-isopropylnaphthalene in the comparatively pure readily separable $\beta$ crystalline form, and separating the thus formed crystals from the mother liquor.

References Cited in the file of this patent

UNITED STATES PATENTS 2,592,589     Nickels _____ Apr. 15, 1952

OTHER REFERENCES

Morton: Laboratory Technique in Organic Chemistry, McGraw-Hill Book Co., New York, N. Y. (1938), first ed., page 154.

UNITED STATES PATENT OFFICE
CERTIFICATE OF CORRECTION

Patent No. 2,850,548                                                            September 2, 1958

Jack H. Thelin et al.

It is hereby certified that error appears in the printed specification of the above numbered patent requiring correction and that the said Letters Patent should read as corrected below.

Column 1, line 42, for "involves" read -- involved --; column 2, line 2, for "so further separation" read -- no further separation --.

Signed and sealed this 18th day of November 1958.

(SEAL)
Attest:
KARL H. AXLINE
Attesting Officer

ROBERT C. WATSON
Commissioner of Patents